US012689233B2

(12) United States Patent
Liu et al.

(10) Patent No.: US 12,689,233 B2
(45) Date of Patent: Jul. 21, 2026

(54) CHARGING MODULE AND DUAL-MODE WIRELESS CHARGING SYSTEM

(71) Applicant: Halo Microelectronics Co., Ltd., Foshan City (CN)

(72) Inventors: Ying Liu, Foshan City (CN); Songnan Yang, Frisco, TX (US)

(73) Assignee: Halo Microelectronics Co., Ltd., Foshan City (CN)

( * ) Notice: Subject to any disclaimer, the term of this patent is extended or adjusted under 35 U.S.C. 154(b) by 1159 days.

(21) Appl. No.: 17/500,563

(22) Filed: Oct. 13, 2021

(65) Prior Publication Data

US 2022/0115912 A1 Apr. 14, 2022

(30) Foreign Application Priority Data

Oct. 14, 2020 (CN) .......................... 202011098327.9

(51) Int. Cl.
| | |
|---|---|
| *H02J 50/12* | (2016.01) |
| *H01F 38/14* | (2006.01) |
| *H02J 7/02* | (2016.01) |
| *H02J 50/40* | (2016.01) |
| *H02J 50/90* | (2016.01) |

(52) U.S. Cl.
CPC .............. *H02J 50/12* (2016.02); *H01F 38/14* (2013.01); *H02J 7/02* (2013.01); *H02J 50/402* (2020.01); *H02J 50/90* (2016.02); *H02J 2207/20* (2020.01)

(58) Field of Classification Search
CPC ...................................................... H02J 50/12
See application file for complete search history.

(56) References Cited

U.S. PATENT DOCUMENTS 9,030,051 B2 * 5/2015 Muratov ................. H02J 50/12
307/104
9,397,505 B2 * 7/2016 Lee .......................... H04B 5/79
(Continued)

FOREIGN PATENT DOCUMENTS

| CN | 106451805 A | 2/2017 |
|---|---|---|
| CN | 107431384 A | 12/2017 |

(Continued)

*Primary Examiner* — Tynese V Mcdaniel
(74) *Attorney, Agent, or Firm* — AP3 Law Firm PLLC

(57) ABSTRACT

The present disclosure provides a charging module and a dual-mode wireless charging system. The charging module includes: a DC/DC converter circuit, a low-frequency charging unit, a high-frequency charging unit, and a controller. The low-frequency charging unit includes low-frequency coils, a low-frequency compensation circuit, and a low-frequency rectifier circuit connected to the DC/DC converter circuit being successively connected. The high-frequency charging unit includes high-frequency coils, a high-frequency tuning circuit, and a high-frequency rectifier circuit connected to the DC/DC converter circuit being successively connected. The high-frequency coils are non-coaxial with the low-frequency coils and partially overlapped with the low-frequency coils, and/or the controller is configured to control, in response to detecting that the high-frequency charging unit supplies power to the battery, the low-frequency charging unit to be turned on or turned off, such that the low-frequency coils are short-circuited or open-circuited at a high operating frequency.

17 Claims, 9 Drawing Sheets

L1 L2

(56) References Cited

U.S. PATENT DOCUMENTS

| | | | | |
|---|---|---|---|---|
| 9,899,908 | B1* | 2/2018 | Zhao | H02J 50/12 |
| 9,912,197 | B2* | 3/2018 | Riehl | H02J 50/402 |
| 9,923,384 | B2* | 3/2018 | Lin | H02J 50/10 |
| 9,923,387 | B2* | 3/2018 | Lin | H02J 50/12 |
| 10,020,683 | B2* | 7/2018 | Carobolante | H04B 5/79 |
| 10,236,941 | B2* | 3/2019 | Hwang | H04B 5/26 |
| 10,291,036 | B2* | 5/2019 | Muratov | H02J 50/402 |
| 10,958,154 | B2* | 3/2021 | Liu | H02J 50/12 |
| 11,218,028 | B2* | 1/2022 | Choi | H02J 50/402 |
| 11,996,700 | B2* | 5/2024 | Zhang | H02J 50/10 |
| 2013/0020988 | A1* | 1/2013 | Kim | H02J 50/12 |
| | | | | 320/108 |
| 2013/0077360 | A1* | 3/2013 | Low | H02J 50/90 |
| | | | | 363/47 |
| 2014/0327390 | A1* | 11/2014 | Park | H02J 50/12 |
| | | | | 320/108 |
| 2015/0357827 | A1* | 12/2015 | Muratov | H04B 5/263 |
| | | | | 307/104 |

| | | | | |
|---|---|---|---|---|
| 2018/0013310 | A1* | 1/2018 | Moussaoui | H02J 50/12 |
| 2018/0048185 | A1* | 2/2018 | Hwang | H02J 50/12 |
| 2018/0083487 | A1* | 3/2018 | Nalbant | H02J 7/00308 |
| 2018/0212469 | A1* | 7/2018 | Liu | H04B 5/79 |
| 2018/0219986 | A1* | 8/2018 | Lee | H01M 50/269 |
| 2018/0309328 | A1* | 10/2018 | Hwang | H02J 50/12 |
| 2020/0343765 | A1* | 10/2020 | Kwon | H02J 50/80 |
| 2020/0346562 | A1* | 11/2020 | Oda | H02J 7/007182 |
| 2021/0013749 | A1* | 1/2021 | Louis | H02J 50/60 |
| 2022/0149662 | A1* | 5/2022 | Hao | H02J 50/12 |
| 2022/0278555 | A1* | 9/2022 | Liu | H02M 7/217 |

FOREIGN PATENT DOCUMENTS

| | | |
|---|---|---|
| CN | 108401474 A | 8/2018 |
| CN | 109478794 A | 3/2019 |
| CN | 109995098 A | 7/2019 |
| CN | 111740512 A | 10/2020 |

* cited by examiner

CHARGING MODULE AND DUAL-MODE WIRELESS CHARGING SYSTEM

PRIORITY CLAIM

This application claims the benefit of and priority to Chinese patent Application No. 202011098327.9, filed on Oct. 14, 2020, which is hereby incorporated by reference in its entirety.

TECHNICAL FIELD

Embodiments of the present disclosure relate to the technical field of wireless charging, and in particular, relate to a charging module and a dual-mode wireless charging system.

BACKGROUND

With the development of smart phones, wireless charging is becoming a standard function equipped on high-end mobile phones. At the current phase, solutions of wireless charging transmitters most employ low-frequency (110 to 148.5 kHz) wireless charging based on the Qi standard. At present, the wireless charging transmitter base based on the Qi standard is generally constituted by one or a plurality of coils. During charging, the mobile phones need to be placed close to the transmitter base and accurately aligned with one coil in the transmitter base, such that highly-efficient wireless transmission of electric energy is achieved. However, once the distance between the mobile phone and the transmitter base increases or the mobile phone is not accurately aligned with the transmit base, the wireless charging fails.

In a system employing the high-frequency wireless charging standard Airfuel Alliance (AFA), an operating frequency is increased to 6.78 MHz, and hence a charging distance and freedom in the plane may be increased, such that a next generation wireless charging user experience is provided for users. Accordingly, the high-frequency (MHz) wireless charging solutions are generally considered as the second-generation wireless charging solutions for mobile terminals, and are also expected to be an evolution trend in the market.

However, during evolution of the wireless charging system from the low-frequency Qi standard to the high-frequency AFA standard, since the mobile terminals based on the Qi standard have a greater user group, a dual-mode solution combining the low-frequency and high-frequency solutions is desired as a transition, such that evolution of the products are more easily accepted by the end users.

During practice of the embodiments of the present disclosure, the inventors have found that the above related has at least the following problem: In a conventional dual-mode wireless charging system in the market, in a receiver device for wireless charging, a charging module needs two coil assemblies and a rectifier circuit module simultaneously supporting high-frequency and low-frequency operations, and select an operating mode of a receiver module based on an operating mode of a transmitter coupled thereto. In addition, the two coil assemblies (high-frequency coils and low-frequency coils) generally adopt a nesting structure. As illustrated in FIG. 1, high-frequency coils L2 is nested to the outside of low-frequency coils L1, and respective ports of the high-frequency coils L2 and the low-frequency coils L1 are arranged at the breaks on the right sides of the coil structures, and the high-frequency coils L2 and the low-frequency coils L1 are connected to the charging module via their respective ports. The system including the receiver charging module with such configuration may not cause any impact in the case of operating at a low frequency. However, in the case of operating at a high frequency, the low-frequency coils approximately resonate at the high frequency, and an inductive electromotive force thereof may generate a great circulating current. Consequently, loss may be caused on the low-frequency coils, and hence power transmission efficiency of the system may be lowered.

SUMMARY

In a first aspect, the embodiments of the present disclosure provide a charging module, applicable to a receiver of a dual-mode wireless charging system. The charging module includes a DC/DC converter circuit, wherein an output terminal of the DC/DC converter circuit is configured to supply power to a battery, a low-frequency charging unit, including low-frequency coils, a low-frequency compensation circuit, wherein an input terminal of the low-frequency compensation circuit is connected to the low-frequency coils, a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit, a high-frequency charging unit, including high-frequency coils being non-coaxial with the low-frequency coils and partially overlapped with the low-frequency coils, a high-frequency tuning circuit, wherein an input terminal of the high-frequency tuning circuit is connected to the high-frequency coils, and a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit, and a controller, configured to control, in response to detecting that the high-frequency charging unit supplies power to the battery, the low-frequency charging unit to be turned on or turned off, such that the low-frequency coils are short-circuited or open-circuited at a high operating frequency.

In some embodiments, the low-frequency coils and the high-frequency coils satisfy the following relationship in a coil plane:

$$R_1 < d < R_1 + r_2$$
$$R_2 < d < R_2 + r_1$$

wherein d represents a distance between a center of the low-frequency coils and a center of the high-frequency coils in the coil plane, $R_1$ represents an outer diameter of a contour of the high-frequency coils, $r_1$ represents an inner diameter of the contour of the high-frequency coils, $R_2$ represents an outer diameter of a contour of the low-frequency coils, $r_2$ represents an inner diameter of the contour of the low-frequency coils.

In some embodiments, the high-frequency coils include at least two turns of sub-coils, and a resonance capacitor is connected in parallel to an innermost turn of sub-coil of the high-frequency coils.

In some embodiments, the low-frequency rectifier circuit includes a first transistor, wherein a source of the first transistor is connected to a first output terminal of the low-frequency compensation circuit, a second transistor, wherein a source of the second transistor is connected to a second output terminal of the low-frequency compensation circuit, and a drain of the second transistor is connected to a drain of the first transistor, a third transistor, wherein a drain of the third transistor is connected to the source of the first transistor, and a source of the third transistor is connected to ground, and a fourth transistor, wherein a drain of the fourth transistor is connected to the source of the second transistor, and a source of the fourth transistor is connected to the source of the third transistor and connected to ground, and a control terminal of the controller is connected to gates of the first transistor, the second transistor, the third transistor, and the fourth transistor, and the controller is configured to, in response to detecting that the high-frequency charging unit supplies power to the battery, control one of the first transistor and the third transistor to be turned on and control one of the second transistor and the fourth transistor to be turned on, such that the low-frequency coils are short-circuited at the high operating frequency.

In some embodiments, the low-frequency charging unit further includes a load modulation circuit, wherein one terminal of the load modulation circuit is connected between the output terminal of the low-frequency compensation circuit and the input terminal of the low-frequency rectifier circuit, and the other terminal of the load modulation circuit is connected to ground, and the load modulation circuit includes a first capacitor, wherein one terminal of the first capacitor is connected between the first output terminal of the low-frequency compensation circuit and a first input terminal of the low-frequency rectifier circuit, a fifth transistor, wherein a drain of the fifth transistor is connected to the other terminal of the first capacitor, and a source of the fifth transistor is connected to ground, a second capacitor, wherein one terminal of the second capacitor is connected between the second output terminal of the low-frequency compensation circuit and a second input terminal of the low-frequency rectifier circuit, and a sixth transistor, wherein a drain of the sixth transistor is connected to the other terminal of the second capacitor, and a source of the sixth transistor is connected to the source of the fifth transistor and connected to ground, and a control terminal of the controller is connected to gates of the fifth transistor and the sixth transistor, and the controller is configured to control, in response to detecting that the high-frequency charging unit supplies power to the battery, the fifth transistor and the sixth transistor to be turned on, such that the low-frequency coils are short-circuited at the high operating frequency.

In some embodiments, the low-frequency charging unit further includes an input clamp circuit, wherein one end of the input clamp circuit is connected between the output terminal of the low-frequency compensation circuit and the input terminal of the low-frequency rectifier circuit, and the other terminal of the input clamp circuit is connected to ground, and the input clamp circuit includes a first resistor, wherein one terminal of the first resistor is connected between the first output terminal of the low-frequency compensation circuit and a first input terminal of the low-frequency rectifier circuit, a seventh transistor, wherein a drain of the seventh transistor is connected to the other terminal of the first resistor, and a source of the seventh transistor is connected to ground, a second resistor, wherein one terminal of the second resistor is connected between the second output terminal of the low-frequency compensation circuit and a second input terminal of the low-frequency rectifier circuit, and an eighth transistor, wherein a drain of the eighth transistor is connected to the other terminal of the second resistor, and a source of the eighth transistor is connected to the source of the seventh transistor and connected to ground, and a control terminal of the controller is connected to gates of the seventh transistor and the eighth transistor, and the controller is configured to control, in response to detecting that the high-frequency charging unit supplies power to the battery, the seventh transistor and the eighth transistor to be turned on, such that the low-frequency coils are short-circuited at the high operating frequency.

In some embodiments, the low-frequency charging unit further includes: a coil switch, wherein the coil switch is connected to a midpoint of wires of the low-frequency coils, a control terminal of the controller is connected to the coil switch, and the controller is configured to control, in response to detecting that the high-frequency charging unit supplies power to the battery, the coil switch to be turned off, such that the low-frequency coils are open-circuited.

In a second aspect, the embodiments of the present disclosure provide a charging module, applicable to a receiver of a dual-mode wireless charging system. The charging module includes a DC/DC converter circuit, wherein an output terminal of the DC/DC converter circuit is configured to supply power to a battery, a low-frequency charging unit, including low-frequency coils, a low-frequency compensation circuit, wherein an input terminal of the low-frequency compensation circuit is connected to the low-frequency coils, a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit, and a high-frequency charging unit, including high-frequency coils being non-coaxial with the low-frequency coils and partially overlapped with the low-frequency coils, a high-frequency tuning circuit, wherein an input terminal of the high-frequency tuning circuit is connected to the high-frequency coils, and a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit.

In some embodiments, the low-frequency coils and the high-frequency coils satisfy the following relationship in a coil plane:

$$R_1 < d < R_1 + r_2$$
$$R_2 < d < R_2 + r_1$$

wherein d represents a distance between a center of the low-frequency coils and a center of the high-frequency coils in the coil plane, $R_1$ represents an outer diameter of a contour of the high-frequency coils, $r_1$ represents an inner diameter of the contour of the high-frequency coils, $R_2$ represents an outer diameter of a contour of the low-frequency coils, $r_2$ represents an inner diameter of the contour of the low-frequency coils.

In some embodiments, the high-frequency coils include at least two turns of sub-coils, and a resonance capacitor is connected in parallel to an innermost turn of sub-coil of the high-frequency coils.

In a third aspect, the embodiments of the present disclosure provide a charging module, applicable to a receiver of a dual-mode wireless charging system. The charging module includes a DC/DC converter circuit, wherein an output terminal of the DC/DC converter circuit is configured to supply power to a battery, a low-frequency charging unit, including low-frequency coils, a low-frequency compensation circuit, wherein an input terminal of the low-frequency compensation circuit is connected to the low-frequency coils, a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit, a high-frequency charging unit, including high-frequency coils, a high-frequency tuning circuit, wherein an input terminal of the high-frequency tuning circuit is connected to the high-frequency coils, and a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit, and a controller, configured to control, in response to detecting that the high-frequency charging unit supplies power to the battery, the low-frequency rectifier circuit to be turned on, such that the low-frequency coils are short-circuited at a high operating frequency.

In some embodiments, the low-frequency rectifier circuit includes a first transistor, wherein a source of the first transistor is connected to a first output terminal of the low-frequency compensation circuit, a second transistor, wherein a source of the second transistor is connected to a second output terminal of the low-frequency compensation circuit, and a drain of the second transistor is connected to a drain of the first transistor, a third transistor, wherein a drain of the third transistor is connected to the source of the first transistor, and a source of the third transistor is connected to ground, and a fourth transistor, wherein a drain of the fourth transistor is connected to the source of the second transistor, and a source of the fourth transistor is connected to the source of the third transistor and connected to ground, and a control terminal of the controller is connected to gates of the first transistor, the second transistor, the third transistor, and the fourth transistor, and the controller is configured to, in response to detecting that the high-frequency charging unit supplies power to the battery, control one of the first transistor and the third transistor to be turned on and control one of the second transistor and the fourth transistor to be turned on, such that the low-frequency coils are short-circuited at the high operating frequency.

In some embodiments, the low-frequency charging unit further includes a load modulation circuit, wherein one terminal of the load modulation circuit is connected between the output terminal of the low-frequency compensation circuit and the input terminal of the low-frequency rectifier circuit, and the other terminal of the load modulation circuit is connected to ground, and the load modulation circuit includes a first capacitor, wherein one terminal of the first capacitor is connected between the first output terminal of the low-frequency compensation circuit and a first input terminal of the low-frequency rectifier circuit, a fifth transistor, wherein a drain of the fifth transistor is connected to the other terminal of the first capacitor, and a source of the fifth transistor is connected to ground, a second capacitor, wherein one terminal of the second capacitor is connected between the second output terminal of the low-frequency compensation circuit and a second input terminal of the low-frequency rectifier circuit, and a sixth transistor, wherein a drain of the sixth transistor is connected to the other terminal of the second capacitor, and a source of the sixth transistor is connected to the source of the fifth transistor and connected to ground, and a control terminal of the controller is connected to gates of the fifth transistor and the sixth transistor, and the controller is configured to control, in response to detecting that the high-frequency charging unit supplies power to the battery, the fifth transistor and the sixth transistor to be turned on, such that the low-frequency coils are short-circuited at the high operating frequency.

In some embodiments, the low-frequency charging unit further includes an input clamp circuit, wherein one end of the input clamp circuit is connected between the output terminal of the low-frequency compensation circuit and the input terminal of the low-frequency rectifier circuit, and the other terminal of the input clamp circuit is connected to ground, and the input clamp circuit includes a first resistor, wherein one terminal of the first resistor is connected between the first output terminal of the low-frequency compensation circuit and a first input terminal of the low-frequency rectifier circuit, a seventh transistor, wherein a drain of the seventh transistor is connected to the other terminal of the first resistor, and a source of the seventh transistor is connected to ground, a second resistor, wherein one terminal of the second resistor is connected between the second output terminal of the low-frequency compensation circuit and a second input terminal of the low-frequency rectifier circuit, and an eighth transistor, wherein a drain of the eighth transistor is connected to the other terminal of the second resistor, and a source of the eighth transistor is connected to the source of the seventh transistor and connected to ground, and a control terminal of the controller is connected to gates of the seventh transistor and the eighth transistor, and the controller is configured to control, in response to detecting that the high-frequency charging unit supplies power to the battery, the seventh transistor and the eighth transistor to be turned on, such that the low-frequency coils are short-circuited at the high operating frequency.

In a fourth aspect, the embodiments of the present disclosure provide a charging module, applicable to a receiver of a dual-mode wireless charging system. The charging module includes a DC/DC converter circuit, wherein an output terminal of the DC/DC converter circuit is configured to supply power to a battery, a low-frequency charging unit, including low-frequency coils, a low-frequency compensation circuit, wherein an input terminal of the low-frequency compensation circuit is connected to the low-frequency coils, a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit, a high-frequency charging unit, including high-frequency coils, a high-frequency tuning circuit, wherein an input terminal of the high-frequency tuning circuit is connected to the high-frequency coils, and a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit, and a controller, configured to control, in response to detecting that the high-frequency charging unit supplies power to the battery, the low-frequency compensation circuit to be turned off, such that the low-frequency coils are open-circuited.

In some embodiments, the low-frequency charging unit further includes: a coil switch, wherein the coil switch is connected to a midpoint of wires of the low-frequency coils, a control terminal of the controller is connected to the coil switch, and the controller is configured to control, in response to detecting that the high-frequency charging unit supplies power to the battery, the coil switch to be turned off, such that the low-frequency coils are open-circuited.

In a fifth aspect, the embodiments of the present disclosure provide a dual-mode wireless charging system. The system includes a receiver, including the charging module according to any one of the first to fourth aspects, and disposed in an electronic device, a transmitter, configured to supply power to the receiver in response to approaching a predetermined range of the receiver, and disposed in a power supply device.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

One or more embodiments are illustrated by way of example, and not by limitation, in the figures of the accompanying drawings, wherein elements/modules and steps having the same reference numeral designations represent like elements/modules and steps throughout. The drawings are not to scale, unless otherwise disclosed.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For clearer descriptions of the objectives, technical solutions, and advantages of the present disclosure, the present disclosure is further described with reference to specific embodiments and attached drawings. It should be understood that the specific embodiments described herein are only intended to explain the present disclosure instead of limiting the present disclosure.

It should be noted that, in the absence of conflict, embodiments of the present disclosure and features in the embodiments may be incorporated, which all fall within the protection scope of the present disclosure. In addition, although function module division is illustrated in the schematic diagrams of devices, and in some occasions, module division different from the divisions of the modules in the devices may be used. Further, the terms "first," "second," and "third" used in this text do not limit data and execution sequences, and are intended to distinguish identical items or similar items having substantially the same functions and effects. When an element is defined as "being connected or coupled to" another element, the element may be directly connected or coupled to the element or one or more centered elements may be present therebetween.

Unless the context clearly requires otherwise, throughout the specification and the claims, technical and scientific terms used herein denote the meaning as commonly understood by a person skilled in the art. Additionally, the terms used in the specification of the present disclosure are merely for description the embodiments of the present disclosure, but are not intended to limit the present disclosure. As used herein, the term "and/or" in reference to a list of one or more items covers all of the following interpretations of the term: any of the items in the list, all of the items in the list and any combination of the items in the list.

In addition, technical features involved in various embodiments of the present disclosure described hereinafter may be combined as long as these technical features are not in conflict.

Specifically, hereinafter, the embodiments of the present disclosure are further illustrated with reference to the accompanying drawings.

First Embodiment

Figure 1:
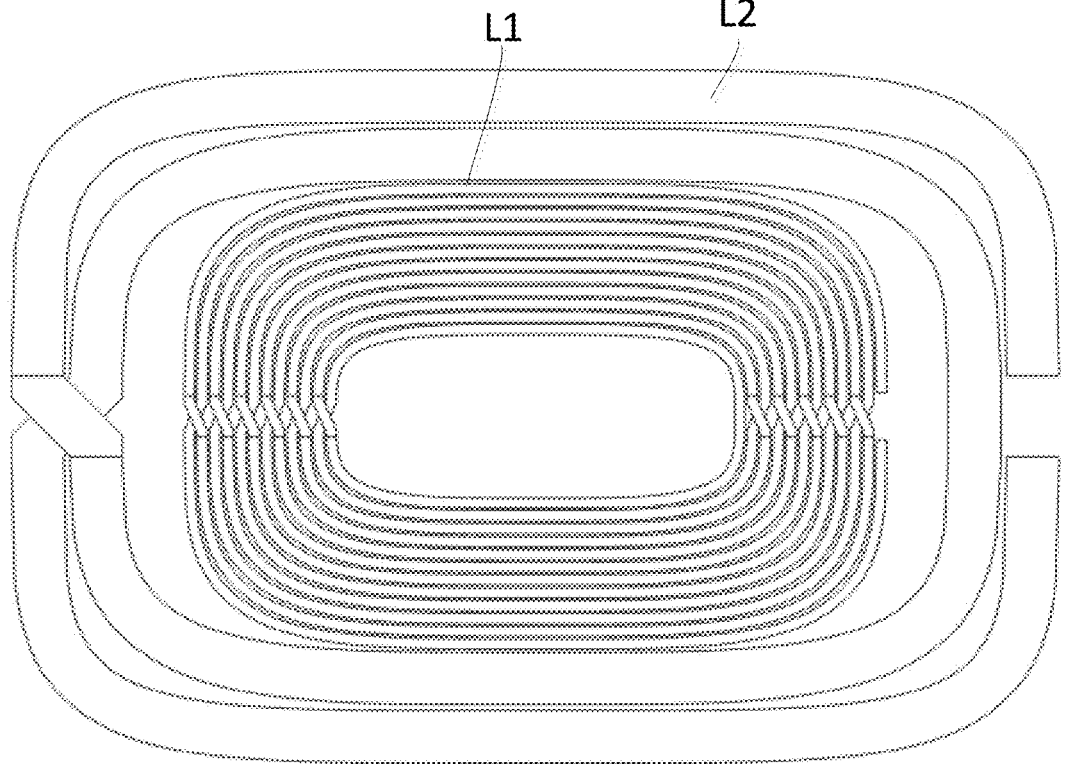
FIG. 1 is a schematic structural view of low-frequency coils and high-frequency coils in a coil plane according to the related art.
Figure 2:
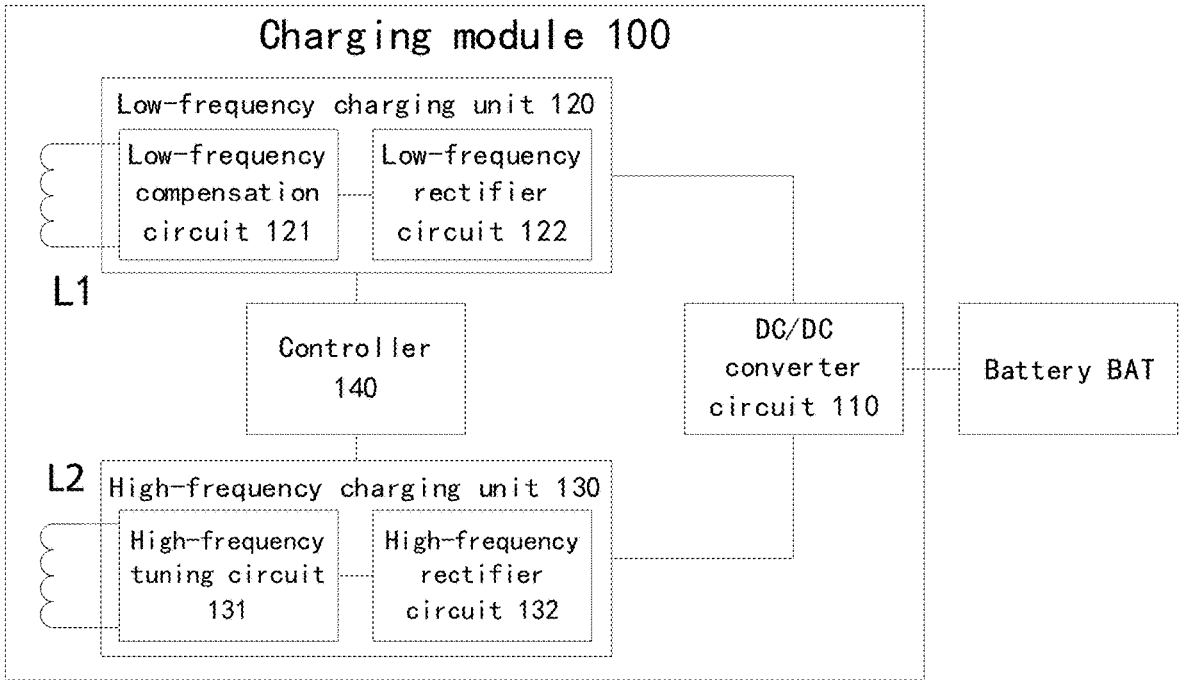
FIG. 2 is a structural block diagram of a charging module according to an embodiment of the present disclosure.

This embodiment of the present disclosure provides a charging module. Referring to FIG. 2, a schematic structural block diagram of a charging module 100 according to an embodiment of the present disclosure is illustrated. The charging module 100 is applicable to a receiver of a dual-mode wireless charging system. The charging module 100 includes: a DC/DC converter circuit 110, a low-frequency charging unit 120, a high-frequency charging unit 130, and a controller 140.

An output terminal of the DC/DC converter circuit 110 is configured to supply power to a battery BAT.

The low-frequency charging unit 120 includes: low-frequency coils L1; a low-frequency compensation circuit 121, wherein an input terminal of the low-frequency compensation circuit 121 is connected to the low-frequency coils L1; and a low-frequency rectifier circuit 122, wherein an input terminal of the low-frequency rectifier circuit 122 is connected to an output terminal of the low-frequency compensation circuit 121, and an output terminal of the low-frequency rectifier circuit 122 is connected to an input terminal of the DC/DC converter circuit 110.

The high-frequency charging unit 130 includes: high-frequency coils L2 non-coaxial with the low-frequency coils L1 and partially overlapped with the low-frequency coils L1; a high-frequency tuning circuit 131, wherein an input terminal of the high-frequency tuning circuit 131 is connected to the high-frequency coils L2; and a high-frequency rectifier circuit 132, wherein an input terminal of the high-frequency rectifier circuit 132 is connected to an output terminal of the high-frequency tuning circuit 131, and an output terminal of the high-frequency rectifier circuit 132 is connected to an input terminal of the DC/DC converter circuit 110.

The controller 140 is configured to control, in response to detecting that the high-frequency charging unit 130 supplies power to the battery BAT, the low-frequency charging unit 120 to be turned on or turned off, such that the low-frequency coils L1 are short-circuited or open-circuited at a high operating frequency.

Further, the controller 140 may further include a communication module to achieve communication with a wireless charging transmitter.

Figure 3:
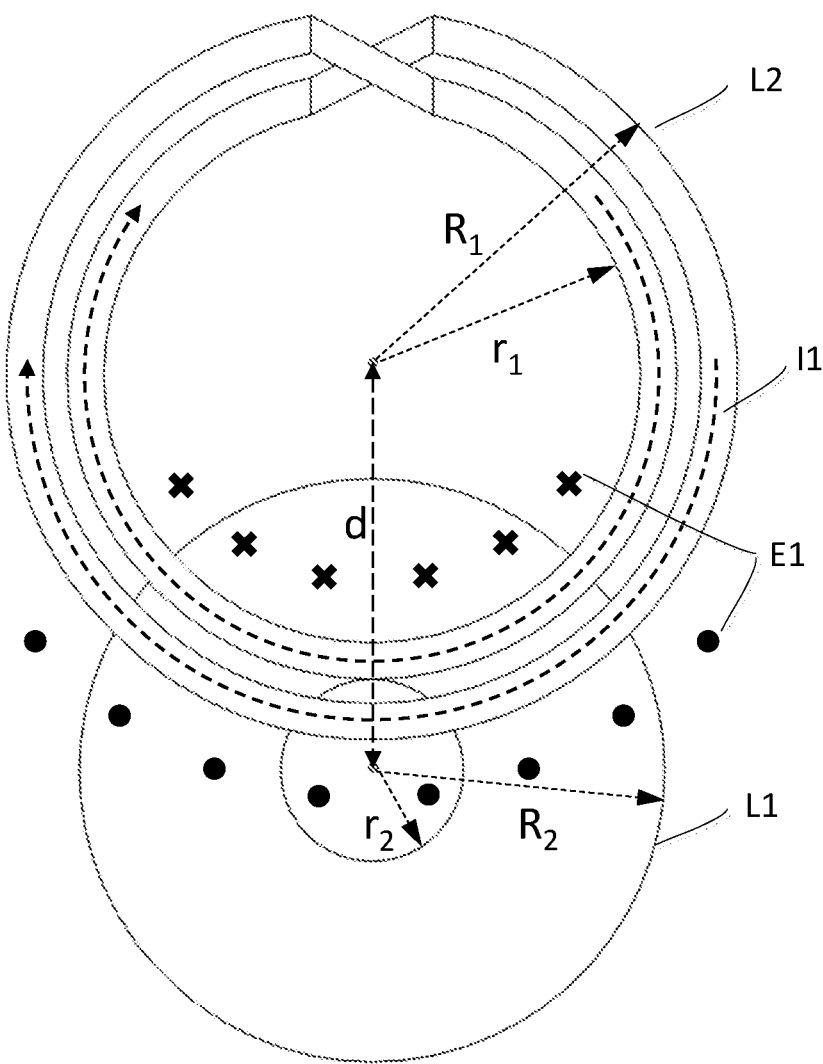
FIG. 3 is a schematic structural view of low-frequency coils and high-frequency coils in a coil plane according to an embodiment of the present disclosure.

In the embodiments of the present disclosure, in combination with FIG. 3, a first structure of the low-frequency coils L1 and the high-frequency coils L2 in a coil plane according to an embodiment of the present disclosure is illustrated. The high-frequency coils L2 include at least two turns of sub-coils, which are represented by closed coils in the drawings. The coils may be broken at any position as ports of the coils. The low-frequency coils L1 include a plurality of turns of sub-coils, which are represented by inner and outer contours of the turns of sub-coils in the drawings. As illustrated in FIG. 3, the high-frequency coils L2 and the low-frequency coils L1 are non-coaxial and partially overlapped. One part of a magnetic field E1 generated by a current I1 on the high-frequency coils L2 in the low-frequency coils L1 is in a direction going into the coil plane (represented by black "x"), and the other part of the magnetic field E1 is in a direction going out of the coil plane (represented by black "••"). Two parts of the magnetic field E1 in the above two directions generate a total magnetic flux in the low-frequency coils L1, which is a difference between two parts of the magnetic field in the two directions. Induced electromotive forces formed by the two parts of the magnetic field E1 in the two directions are offset by each other. Coupling between the high-frequency coils L2 and the low-frequency coils L1 are accordingly reduced. Therefore, in the case that the system operates at a high frequency, induction of the current I1 of the high-frequency coils L2 on the low-frequency coils L1 generates a small or even zero electromotive force. Therefore, loss caused by self-resonance of the low-frequency coils L1 under high frequencies is also small or even zero. In the meantime, presence of the low-frequency coils L1 may not decrease an equivalent inductance and quality factor of the high-frequency coils L2. Configuration of partially overlapped coils may essentially mitigate impacts caused by coupling between coils to power transmission efficiency of the low-frequency coils L1 operating under high frequencies.

In addition, in the case that an outermost turn (outer diameter/outer contour) of the high-frequency coils L2 enters an inner side of an innermost turn (inner diameter/inner contour) of the low-frequency coil L1, and an outermost turn (outer diameter/outer contour) of the low-frequency coils L1 also enters an inner side of an innermost turn (inner diameter/inner contour) of the high-frequency coils L2, coupling between the high-frequency coils L2 and the low-frequency coils L1 is significantly reduced, and under some specific offset situations, zero coupling may be achieved. Therefore, in some embodiments, the low-frequency coils L1 and the high-frequency coils L2 satisfy the following relationship in a coil plane:

$$R_1 < d < R_1 + r_2$$
$$R_2 < d < R_2 + r_1$$

As illustrated in FIG. 3, d represents a distance between a center of the low-frequency coils L1 and a center of the high-frequency coils L2 in the coil plane, $R_1$ represents an outer diameter of a contour of the high-frequency coils L2, $r_1$ represents an inner diameter of the contour of the high-frequency coils L2, $R_2$ represents an outer diameter of a contour of the low-frequency coils L1, $r_2$ represents an inner diameter of the contour of the low-frequency coils L1.

Figure 4:
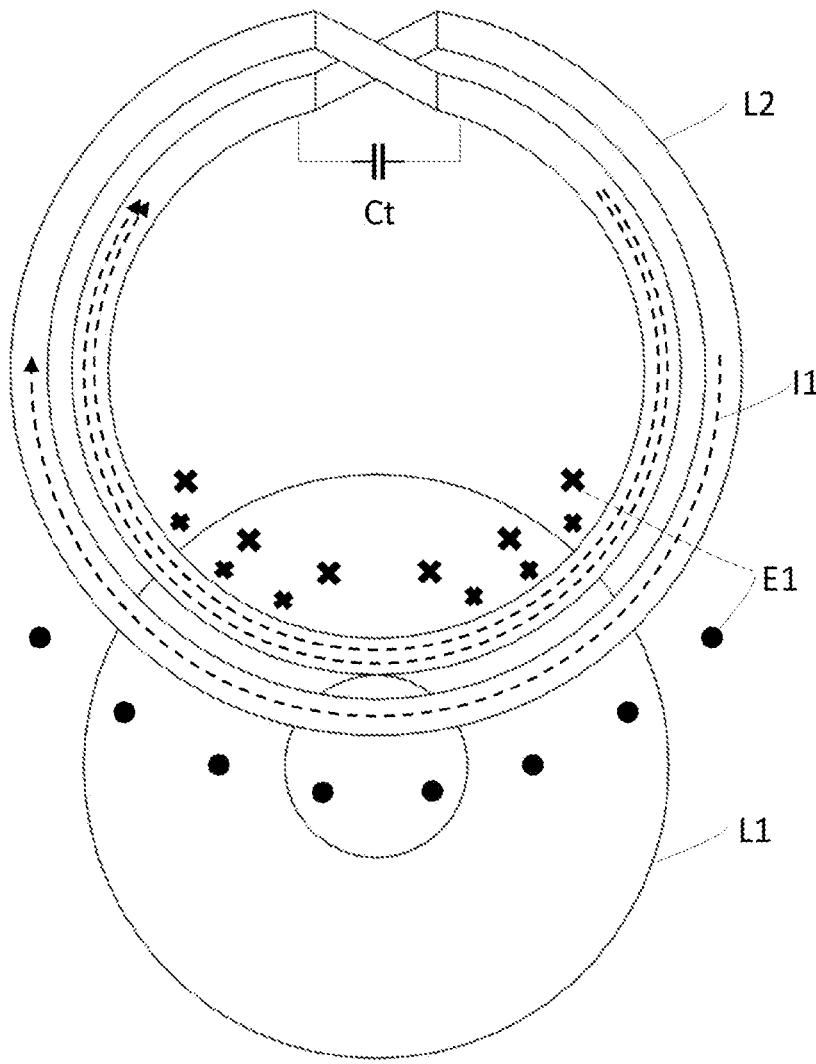
FIG. 4 is a schematic structural view of low-frequency coils and high-frequency coils in a coil plane according to an embodiment of the present disclosure.

Further, in some embodiments, referring to FIG. 4, a structure of the low-frequency coils L1 and the high-frequency coils L2 in the coil plane is illustrated. The high-frequency coils L2 include at least two turns of sub-coils, the low-frequency coils L1 include a plurality of turns of sub-coils, and a resonance capacitor Ct may be connected in parallel to an innermost turn of sub-coil of the high-frequency coils L2. An upper limit of a capacitance of the resonance capacitor Ct is a capacitance that causes an inner turn of coil of the high-frequency coils L2 individually resonates at the high operating frequency. The resonance capacitor Ct is capable of maintaining a current direction on the inner turn of coil of the high-frequency coils L2 unchanged and increasing an amplitude of the current, such that the magnetic field (represented by black "x" in FIG. 4) going into the coil plane that is next to the innermost turn of coil on the inner side of the high-frequency coils L2 is strengthened, whereas the magnetic field (represented by black "••" in FIG. 4) going out of the coil plane on the outer side of the coils is not apparently changed. In this way, inner and outer distribution of the magnetic field E1 of the high-frequency coils L2 is changed, and coupling between the high-frequency coils L2 and the low-frequency coils L1 can be fine tuned.

Further, the resonance capacitor Ct may also be connected in parallel on the outermost turn of coil of the high-frequency coils L2, and an equivalent offset adjustment is to increase a distance between centers of the coils. Specifically, coupling between the high-frequency coils and the low-frequency coils may be finely controlled by adjusting the resonance capacitor Ct based on actual situations of an integration environment of the coils.

It should be noted that during actual configuration of the charging module, the number of turns, the arrangements, and the models of the low-frequency coils L1 and the high-frequency coils L2, and the models and the like of the resonance capacitor Ct need to be selected according to actual needs, which are not limited to those in the drawings and the embodiments of the present disclosure.

Figure 5:
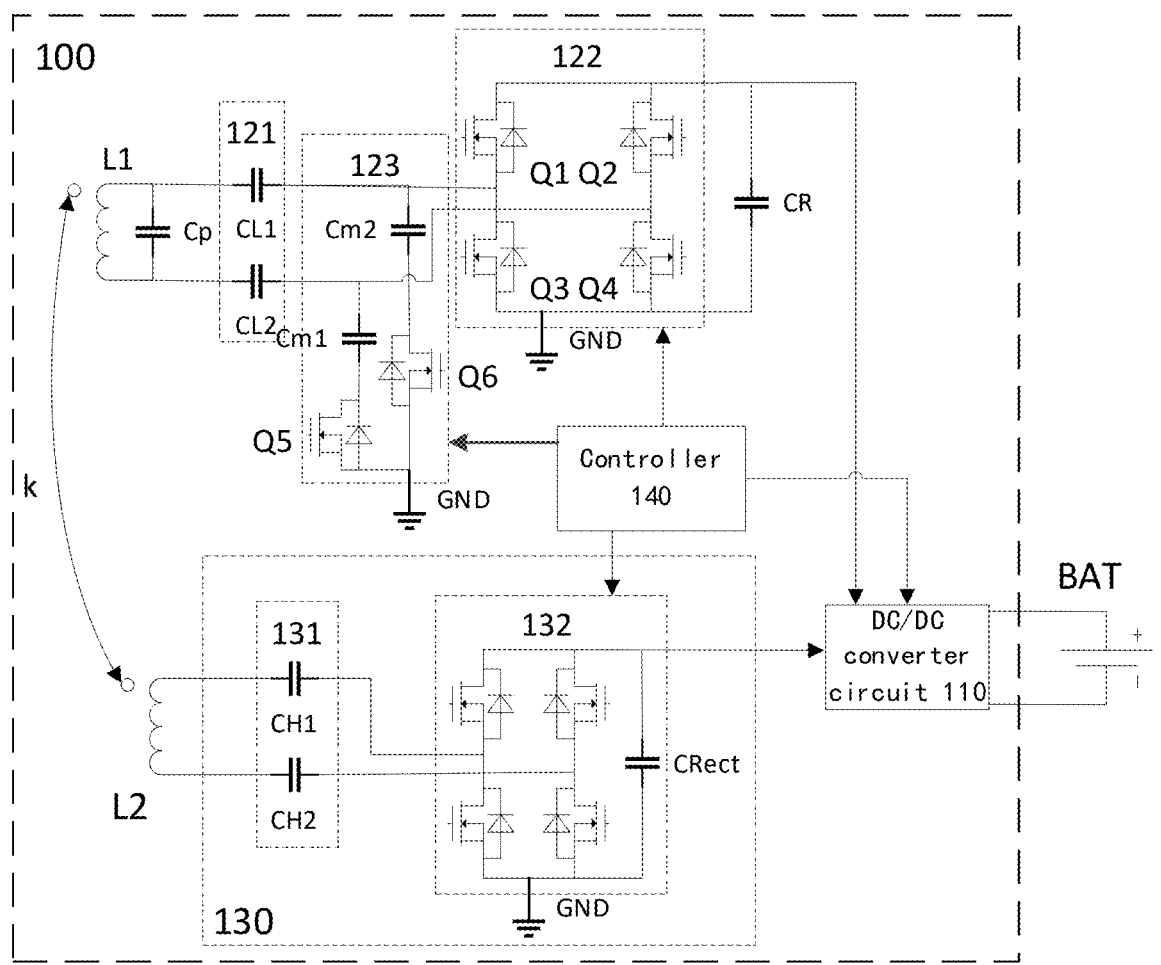
FIG. 5 is a schematic circuit structural diagram of a charging module according to an embodiment of the present disclosure.

In some embodiments, referring to FIG. 5, a circuit structure of a charging module according to an embodiment of the present disclosure is illustrated. Based on the charging module as illustrated in FIG. 2, the low-frequency rectifier circuit 122 includes: a first transistor Q1, wherein a source of the first transistor Q1 is connected to a first output terminal of the low-frequency compensation circuit 121; a second transistor Q2, wherein a source of the second transistor Q2 is connected to a second output terminal of the low-frequency compensation circuit 121, and a drain of the second transistor Q2 is connected to a drain of the first transistor Q1; a third transistor Q3, wherein a drain of the third transistor Q3 is connected to the source of the first transistor Q1, and a source of the third transistor Q3 is connected to ground; and a fourth transistor Q4, wherein a drain of the fourth transistor Q4 is connected to the source of the second transistor Q2, and a source of the fourth transistor Q4 is connected to the source of the third transistor Q3 and connected to ground.

A control terminal of the controller 140 is connected to gates of the first transistor Q1, the second transistor Q2, the third transistor Q3, and the fourth transistor Q4, and the controller 140 is configured to, in response to detecting that the high-frequency charging unit 130 supplies power to the battery BAT, control one of the first transistor Q1 and the third transistor Q3 to be turned on and control one of the second transistor Q2 and the fourth transistor Q4 to be turned on, such that the low-frequency coils L1 are short-circuited at the high operating frequency.

It should be noted that the control terminal of the controller 140 may be directly connected to the gates of the first transistor Q1, the second transistor Q2, the third transistor Q3, and the fourth transistor Q4, or may convert a level to a suitable drive level via a drive circuit and then be connected to the gates. Specifically, configurations may be made based on a chip of the controller 140 employed in constructing the charging module, and the models of the first transistor Q1, the second transistor Q2, the third transistor Q3, and the fourth transistor Q4, which are not limited to those in the embodiments and drawings of the present disclosure.

Specifically, in the embodiments of the present disclosure, the first transistor Q1 and the fourth transistor Q4 are controlled to be turned on, or the second transistor Q2 and the third transistor Q3 are controlled to be turned on, such that the low-frequency coils L1 are directly connected in series to the filter capacitor CR via compensation capacitors CL1 and CL2 thereof. Since a capacitance of the filter capacitor CR is often at a microfarad magnitude (used for filtering), the filter capacitor CR is equivalently short-circuited at the high operating frequency. Similarly, since capacitances of the low-frequency compensation capacitors CL1 and CL2 are often close to 1 microfarad, the low-frequency compensation capacitors CL1 and CL2 are also equivalently short-circuited at the high operating frequency, such that the two ends of the low-frequency coils L1 are short-circuited at the high operating frequency to eliminate resonance of the low-frequency coils L1 at the high frequency caused by a parasitic capacitor Cp. In this case, even in the case that the current on the high-frequency coils L2 generates an induced electromotive force on the low-frequency coils L1, since the low-frequency coils L1 no longer resonate at the high frequency and present a high inductive reactance, the current on the low-frequency coils L1 may be significantly reduced, thereby reducing the impact caused by the presence of the low-frequency coils L1 on the power transmission of the high-frequency coils L2.

Similarly, in the embodiments of the present disclosure, the first transistor Q1 and the second transistor Q2 are controlled to be turned on, or the fourth transistor Q4 and the third transistor Q3 are controlled to be turned on, such that the two ends of the low-frequency coils L1 are directly connected via compensation capacitors CL1 and CL2. The capacitances of the low-frequency compensation capacitors CL1 and CL2 are equivalently short-circuited at the high operating frequency, such that the two ends of the low-frequency coils L1 are short-circuited at the high operating frequency to eliminate resonance of the low-frequency coils L1 at the high frequency caused by a parasitic capacitor Cp. In this case, even in the case that the current on the high-frequency coils L2 generates an induced electromotive force on the low-frequency coils L1, since the low-frequency coils L1 no longer resonate at the high frequency and present a high inductive reactance, the current on the low-frequency coils L1 may be significantly reduced, thereby reducing the impact caused by the presence of the low-frequency coils L1 on the power transmission of the high-frequency coils L2.

In some embodiments, continue referring to FIG. 5, the low-frequency charging unit 120 further includes a load modulation circuit 123, wherein one terminal of the load modulation circuit 123 is connected between the output terminal of the low-frequency compensation circuit 121 and the input terminal of the low-frequency rectifier circuit 122, and the other terminal of the load modulation circuit 123 is connected to ground.

The load modulation circuit 123 includes: a first capacitor Cm1, wherein one terminal of the first capacitor Cm1 is connected between the first output terminal of the low-frequency compensation circuit 121 and a first input terminal of the low-frequency rectifier circuit 122; a fifth transistor Q5, wherein a drain of the fifth transistor Q5 is connected to the other terminal of the first capacitor Cm1, and a source of the fifth transistor Q5 is connected to ground; a second capacitor Cm2, wherein one terminal of the second capacitor Cm2 is connected between the second output terminal of the low-frequency compensation circuit 121 and a second input terminal of the low-frequency rectifier circuit 122; and a sixth transistor Q6, wherein a drain of the sixth transistor Q6 is connected to the other terminal of the second capacitor Cm2, and a source of the sixth transistor Q6 is connected to the source of the fifth transistor Q5 and connected to ground.

The control terminal of the controller 140 is connected to gates of the fifth transistor Q5 and the sixth transistor Q6, and the controller 140 is configured to control, in response to detecting that the high-frequency charging unit 130 supplies power to the battery BAT, the fifth transistor Q5 and the sixth transistor Q6 to be turned on, such that the low-frequency coils L1 are short-circuited at the high operating frequency.

Different from the above-mentioned method of controlling the first transistor Q1 and the fourth transistor Q4 to be turned on or turned off, or controlling the second transistor Q2 and the third transistor Q3 to be turned on or turned off, the embodiments of the present disclosure are implemented by continuously turning on a load modulation switch, that is, the fifth transistor Q5 and the sixth transistor Q6. The fifth transistor Q5 and the sixth transistor Q6 are both connected to a tuning capacitor port of the low-frequency coils L1 via modulation capacitors Cm1 and Cm2. The capacitances of the modulation capacitors Cm1 and Cm2 are often within the range of several tens of nano-farads, and the modulation capacitors Cm1 and Cm2, and the low-frequency compensation capacitors CL1 and CL2 are approximately short-circuited at the operating frequency of high-frequency wireless charging. Therefore, by continuously turning on the fifth transistor Q5 and the sixth transistor Q6, the two modulation capacitors Cm1 and Cm2 may be connected in parallel to the two ports of the low-frequency coils L1, such that the two ends of the low-frequency coils L1 are close to an alternating current short circuit, so as to achieve the purpose of eliminating resonance of the low-frequency coils L1 at the high frequency caused by the parasitic capacitor Cp.

Figure 6:
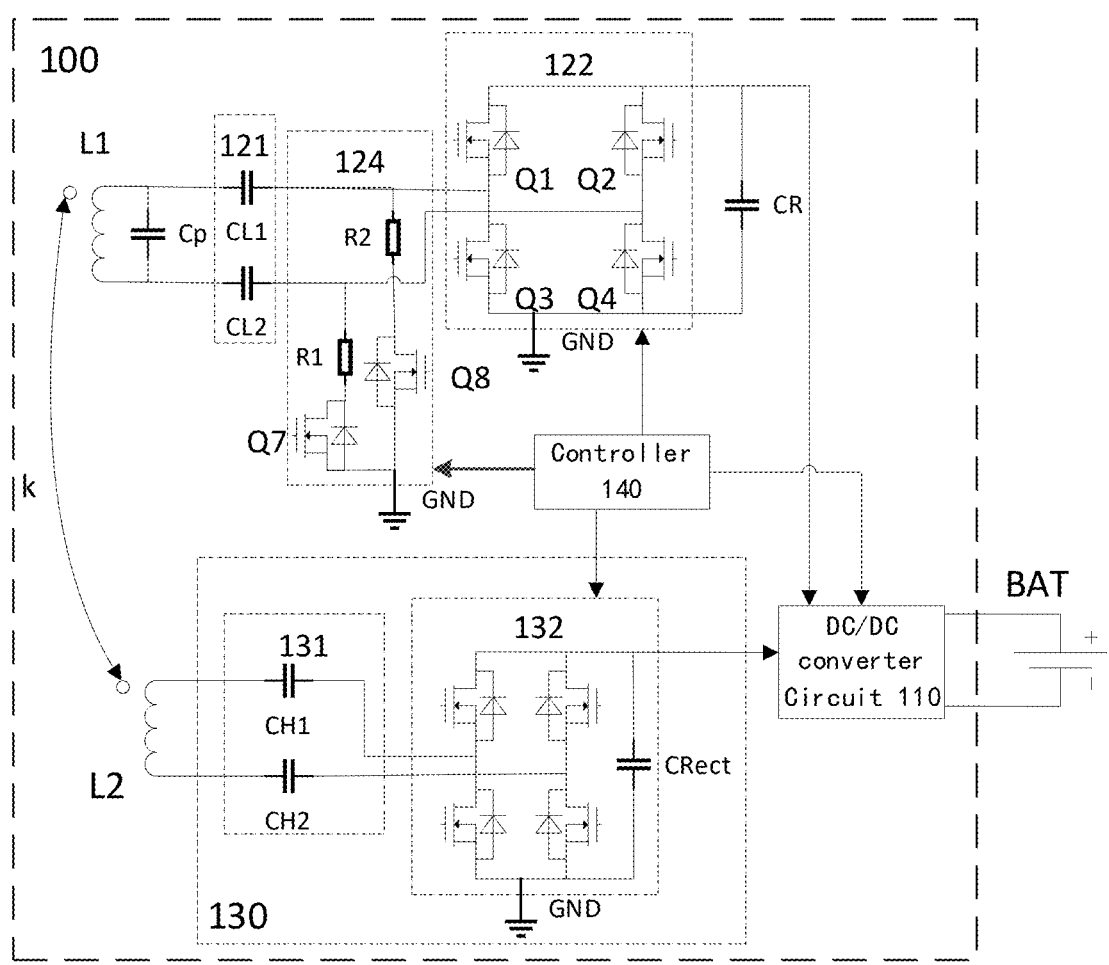
FIG. 6 is a schematic circuit structural diagram of a charging module according to an embodiment of the present disclosure.

In some embodiments, referring to FIG. 6, a circuit structure of a charging module according to an embodiment of the present disclosure is illustrated. Based on the charging module as illustrated in FIG. 2, the low-frequency charging unit 120 further includes: an input clamp circuit 124, wherein one terminal of the input clamp circuit 124 is connected between the output terminal of the low-frequency compensation circuit 121 and the input terminal of the low-frequency rectifier circuit 122, and the other terminal of the input clamp circuit 124 is connected to ground.

The input clamp circuit 124 includes: a first resistor R1, wherein one terminal of the first resistor R1 is connected to the first output terminal of the low-frequency compensation circuit 121 and the first input terminal of the low-frequency rectifier circuit 122; a seventh transistor Q7, wherein a drain of the seventh transistor Q7 is connected to the other terminal of the first resistor R1, and a source of the seventh transistor Q7 is connected to ground; a second resistor R2, wherein one terminal of the second resistor R2 is connected between the second output terminal of the low-frequency compensation circuit 121 and the second input terminal of the low-frequency rectifier circuit 122; and an eighth transistor Q8, wherein a drain of the eighth transistor Q8 is connected to the other terminal of the second resistor R2, and a source of the eighth transistor Q8 is connected to the source of the seventh transistor Q7 and connected to ground.

The control terminal of the controller 140 is connected to gates of the seventh transistor Q7 and the eighth transistor Q8, and the controller 140 is configured to control, in response to detecting that the high-frequency charging unit 130 supplies power to the battery BAT, the seventh transistor Q7 and the eighth transistor Q8 to be turned on, such that the low-frequency coils L1 are short-circuited at the high operating frequency.

In the embodiments of the present disclosure, different from the embodiment as illustrated in FIG. 5, the low-frequency charging unit 120 includes the input clamp circuit 124. In the input clamping circuit 124, due to the clamping resistance, that is, resistances of the first resistor R1 and the second resistor R2 are often very small (several ohms), low impedances at the port of the low-frequency coils L1 may be achieved by controlling the seventh transistor Q7 and the eighth transistor Q8 to be continuously turned on. Since impedances of the first resistor R1 and the second resistor R2 are much smaller than the impedance of the parasitic capacitor Cp at the high frequency, resonance of the low-frequency coils L1 at the high frequency may also be effectively eliminated.

Figure 7:
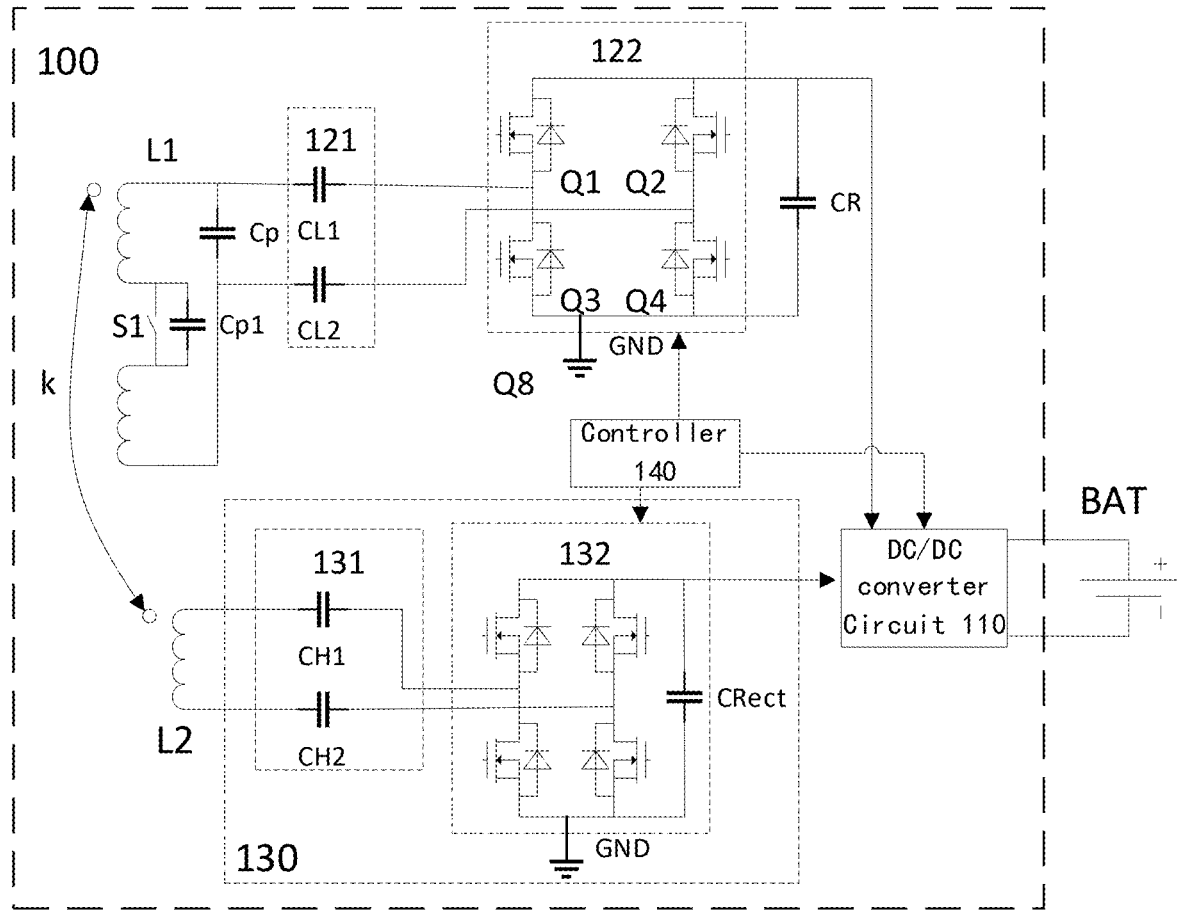
FIG. 7 is a schematic circuit structural diagram of a charging module according to an embodiment of the present disclosure.

In some embodiments, referring to FIG. 7, a circuit structure of the charging module 100 according to an embodiment of the present disclosure is illustrated. Based on the charging module as illustrated in FIG. 2, the low-frequency charging unit 120 further includes: a coil switch S1, wherein the coil switch S1 is connected to a midpoint of wires of the low-frequency coils L1, the control terminal of the controller 140 is connected to the coil switch S1, and the controller 140 is configured to control, in response to detecting that the high-frequency charging unit 130 supplies power to the battery BAT, the coil switch S1 to be turned off, such that the low-frequency coils L1 are open-circuited.

In the embodiments of the present disclosure, in the case that the system operates in a low frequency mode, the coil switch S1 is turned on; and in the case that the system operates in a high frequency mode, the coil switch S1 is turned off. In the case that the coil switch S1 is turned off, the low-frequency coils L1 are open, a coil conductor fails to support flow of the current, and the alternating current may be only supported by the parasitic capacitances Cp and Cp1 distributed between the coils to. Since the coil switch S1 is turned off, a total inductance of the low-frequency coils L1 is significantly reduced, and the parasitic capacitances Cp1 and Cp after being connected in series are also significantly reduced compared with those before the disconnection. An overall impact on the low-frequency coils L1 lies in that the self-resonance frequency is significantly increased to be much higher than the operating frequency of high-frequency wireless charging. Therefore, even in the case that coupling between the high-frequency coils L2 and the low-frequency coils L1 is strong at this time, a large current cannot be generated on the low-frequency coil L1.

In an embodiment, the coil switch S1 is disposed at a center of the low-frequency coils L1. In this way, the total inductance of the low-frequency coils L1 may be reduced to the greatest degree, such that the total inductance is approximately half of the total inductance before breaking of the coils. In addition, the coil switch S1 disposed at the center of the low-frequency coils L1 may also reduce the parasitic capacitance to the greatest extent, such that the self-resonance frequency of the low-frequency coils L1 is significantly increased in the case that the coil switch S1 is turned off.

In some embodiments, referring to FIG. 5, FIG. 6, and/or FIG. 7, the high-frequency tuning circuit 131 includes: a turning capacitor CH1 connected between a first output terminal of the high-frequency coils L2 and the first input terminal of the high-frequency rectifier circuit 132, and a tuning capacitor CH2 connected between a second output terminal of the high-frequency coils L2 and the second input terminal of the high-frequency rectifier circuit 132.

In an embodiment, the tuning capacitor CH1 and the tuning capacitor CH2 resonate with the high-frequency coils L2 at the high operating frequency (for example, 6.78 MHz, or 13.56 MHz, or the like). Therefore, capacitances of the tuning capacitor CH1 and the tuning capacitor CH2 may fall between 1 and several nano-farads. In addition, the low-frequency compensation circuit 121 corresponding to the low-frequency coils L1 is constituted by the first capacitor CL1 and the second capacitor CL2, and the first capacitor CL1 and the second capacitor CL2 resonate with the low-frequency coils L1 at a frequency of 100 KHz or even lower. Therefore, the capacitances of the first capacitor CL1 and the second capacitor CL2 may be approximately several hundreds of nano-farads. Specifically, the capacitances of the tuning capacitor CH1, the tuning capacitor CH2, the first capacitor CL1, and the second capacitor CL2 may be defined according to actual situations, which are not limited to those in the embodiments of the present disclosure.

The high-frequency rectifier circuit 132 includes a current bridge having the same structure as the low-frequency rectifier circuit 122. Specifically, in the current bridges of the high-frequency rectifier circuit 132 and the low-frequency rectifier circuit 122, models of the transistors may be the same or different. The high-frequency rectifier circuit 132 may also employ the resonance rectifier circuit or other bridgeless rectifier circuits, which may be specifically defined according to actual needs, and not limited to those in the embodiments of the present disclosure.

Second Embodiment

This embodiment of the present disclosure provides a charging module. Referring to FIG. 2, a schematic structural diagram of a charging module 100 according to an embodiment of the present disclosure is illustrated. The charging module 100 is applicable to a receiver of a dual-mode wireless charging system. The charging module 100 includes: a DC/DC converter circuit 110, a low-frequency charging unit 120, a high-frequency charging unit 130, and a controller 140.

An output terminal of the DC/DC converter circuit 110 is configured to supply power to a battery BAT.

The low-frequency charging unit 120 includes: low-frequency coils L1; a low-frequency compensation circuit 121, wherein an input terminal of the low-frequency compensation circuit 121 is connected to the low-frequency coils L1; and a low-frequency rectifier circuit 122, wherein an input terminal of the low-frequency rectifier circuit 122 is connected to an output terminal of the low-frequency compensation circuit 121, and an output terminal of the low-frequency rectifier circuit 122 is connected to an input terminal of the DC/DC converter circuit 110.

The high-frequency charging unit 130 includes: high-frequency coils L2 non-coaxial with the low-frequency coils and partially overlapped with the low-frequency coils; a high-frequency tuning circuit 131, wherein an input terminal of the high-frequency tuning circuit 131 is connected to the high-frequency coils L2; and a high-frequency rectifier circuit 132, wherein an input terminal of the high-frequency rectifier circuit 132 is connected to an output terminal of the high-frequency tuning circuit 131, and an output terminal of the high-frequency rectifier circuit 132 is connected to an input terminal of the DC/DC converter circuit 110.

In some embodiments, in combination with FIG. 3, the high-frequency coils L2 include at least two turns of sub-coils, the low-frequency coils L1 include a plurality of turns of sub-coils, and the high-frequency coils L2 and the low-frequency coils L1 are non-coaxial and partially overlapped. In addition, the low-frequency coils L1 and the high-frequency coils L2 satisfy the following relationship in a coil plane:

$$R_1 < d < R_1 + r_2$$

$$R_2 < d < R_2 + r_1$$

d represents a distance between a center of the low-frequency coils L1 and a center of the high-frequency coils L2 in the coil plane, $R_1$ represents an outer diameter of a contour of the high-frequency coils L2, $r_1$ represents an inner diameter of the contour of the high-frequency coils L2, $R_2$ represents an outer diameter of a contour of the low-frequency coils L1, $r_2$ represents an inner diameter of the contour of the low-frequency coils L1.

As described above, configuration that the high-frequency coils L2 and the low-frequency coils L1 are non-coaxial and partially overlapped may effectively reduce coupling between the low-frequency coils L1 and the high-frequency coils L2, or even achieves zero coupling under some occasions. Therefore, in the case that the system operates at a high frequency, induction of a current I1 of the high-frequency coils L2 on the low-frequency coils L1 generates a small or even zero electromotive force. Therefore, loss caused by self-resonance of the low-frequency coils L1 under high frequencies is also small or even zero. In the meantime, presence of the low-frequency coils L1 may not decrease an equivalent inductance and a coil quality factor of the high-frequency coils L2. In the embodiments of the present disclosure, configuration of partially overlapped coils may essentially mitigate impacts caused by coupling between coils to power transmission efficiency of the low-frequency coils L1 operating under high frequencies.

In some embodiments, in combination with FIG. 4, the high-frequency coils L2 include at least two turns of sub-coils, the low-frequency coils L1 include a plurality of turns of sub-coils, and a resonance capacitor Ct is connected in parallel to an innermost turn of sub-coil of the high-frequency coils L2. Specifically, coupling between the low-frequency coils and the high-frequency coils may be finely controlled by adjusting the resonance capacitor Ct based on actual situations of an integration environment of the coils, such that less coupling is achieved, to mitigate the impacts caused by coupling between coils to power transmission efficiency of the low-frequency coils L1 operating under high frequencies.

It should be noted that during actual configuration of the charging module, the number of turns, the arrangements, and the models of the low-frequency coils L1 and the high-frequency coils L2, and the models and the like of the resonance capacitor Ct need to be selected according to actual needs, which are not limited to those in the drawings and the embodiments of the present disclosure.

Third Embodiment

This embodiment of the present disclosure provides a charging module. Referring to FIG. 2, a schematic structural block diagram of a charging module 100 according to an embodiment of the present disclosure is illustrated. The charging module 100 is applicable to a receiver of a dual-mode wireless charging system. The charging module 100 includes: a DC/DC converter circuit 110, a low-frequency charging unit 120, a high-frequency charging unit 130, and a controller 140.

An output terminal of the DC/DC converter circuit 120 is configured to supply power to a battery BAT.

The low-frequency charging unit 120 includes: low-frequency coils L1; a low-frequency compensation circuit 121, wherein an input terminal of the low-frequency compensation circuit 121 is connected to the low-frequency coils L1; and a low-frequency rectifier circuit 122, wherein an input terminal of the low-frequency rectifier circuit 122 is connected to an output terminal of the low-frequency compensation circuit 121, and an output terminal of the low-frequency rectifier circuit 122 is connected to an input terminal of the DC/DC converter circuit 110.

The high-frequency charging unit 130 includes: high-frequency coils L2; a high-frequency tuning circuit 131, wherein an input terminal of the high-frequency tuning circuit 131 is connected to the high-frequency coils L2; and a high-frequency rectifier circuit 132, wherein an input terminal of the high-frequency rectifier circuit 132 is connected to an output terminal of the high-frequency tuning circuit 131, and an output terminal of the high-frequency rectifier circuit 132 is connected to an input terminal of the DC/DC converter circuit 110.

The controller 140 is configured to control, in response to detecting that the high-frequency charging unit 130 supplies power to the battery BAT, the low-frequency rectifier circuit 122 to be turned on, such that the low-frequency coils L1 are short-circuited at a high operating frequency.

In some embodiments, referring to FIG. 5, based on the charging module as illustrated in FIG. 2, the low-frequency rectifier circuit 122 includes: a first transistor Q1, wherein a source of the first transistor Q1 is connected to a first output terminal of the low-frequency compensation circuit 121; a second transistor Q2, wherein a source of the second transistor Q2 is connected to a second output terminal of the low-frequency compensation circuit 121, and a drain of the second transistor Q2 is connected to a drain of the first transistor Q1; a third transistor Q3, wherein a drain of the third transistor Q3 is connected to the source of the first transistor Q1, and a source of the third transistor Q3 is connected to ground; and a fourth transistor Q4, wherein a drain of the fourth transistor Q4 is connected to the source of the second transistor Q2, and a source of the fourth transistor Q4 is connected to the source of the third transistor Q3 and connected to ground.

A control terminal of the controller 140 is connected to gates of the first transistor Q1, the second transistor Q2, the third transistor Q3, and the fourth transistor Q4, and the controller 140 is configured to, in response to detecting that the high-frequency charging unit 130 supplies power to the battery BAT, control one of the first transistor Q1 and the third transistor Q3 to be turned on and control one of the second transistor Q2 and the fourth transistor Q4 to be turned on, such that the low-frequency coils L1 are short-circuited at the high operating frequency.

According to the embodiments of the present disclosure, the first transistor Q1 and the fourth transistor Q4 are controlled to be turned on, or the second transistor Q2 and the third transistor Q3 are controlled to be turned on, or the first transistor Q1 and the second transistor Q2 are controlled to be turned on, or the fourth transistor Q4 and the third transistor Q3 are controlled to be turned on, such that two ends of the low-frequency coils L1 are equivalently short-circuited or directly short-circuited at the high operating frequency via a filter capacitor CR. In this way, resonance of the low-frequency coils L1 under high frequencies caused by the parasitic capacitor Cp is eliminated, and hence power transmission efficiency of the system is improved.

It should be noted that the control terminal of the controller 140 may be directly connected to the gates of the first transistor Q1, the second transistor Q2, the third transistor Q3, and the fourth transistor Q4, or may convert a level to a suitable drive level via a drive circuit and then be connected to the gates. Specifically, configurations may be made based on a chip of the controller 140 employed in constructing the charging module, and the models of the first transistor Q1, the second transistor Q2, the third transistor Q3, and the fourth transistor Q4, which are not limited to those in the embodiments and drawings of the present disclosure.

In some embodiments, continue referring to FIG. 5, the low-frequency charging unit 120 further includes a load modulation circuit 123, wherein one terminal of the load modulation circuit 123 is connected between the output terminal of the low-frequency compensation circuit 121 and the input terminal of the low-frequency rectifier circuit 122, and the other terminal of the load modulation circuit 123 is connected to ground.

The load modulation circuit 123 includes: a first capacitor Cm1, wherein one terminal of the first capacitor Cm1 is connected between the first output terminal of the low-frequency compensation circuit 121 and a first input terminal of the low-frequency rectifier circuit 122; a fifth transistor Q5, wherein a drain of the fifth transistor Q5 is connected to the other terminal of the first capacitor Cm1, and a source of the fifth transistor Q5 is connected to ground; a second capacitor Cm2, wherein one terminal of the second capacitor Cm2 is connected between the second output terminal of the low-frequency compensation circuit 121 and a second input terminal of the low-frequency rectifier circuit 122; and a sixth transistor Q6, wherein a drain of the sixth transistor Q6 is connected to the other terminal of the second capacitor Cm2, and a source of the sixth transistor Q6 is connected to the source of the fifth transistor Q5 and connected to ground.

The control terminal of the controller 140 is connected to gates of the fifth transistor Q5 and the sixth transistor Q6, and the controller 140 is configured to control, in response to detecting that the high-frequency charging unit 130 supplies power to the battery BAT, the fifth transistor Q5 and the sixth transistor Q6 to be turned on, such that two ends of the low-frequency coils L1 are short-circuited at the high operating frequency.

According to the embodiments of the present disclosure, the fifth transistor Q5 and the sixth transistor Q6 are controlled to be turned on, and since capacitances of the modulation capacitors Cm1 and Cm2 are generally several tens of nano-farads, the modulation capacitors Cm1 and Cm2 and low-frequency compensation capacitors CL1 and CL2 are both approximately short-circuited at an operating frequency of high-frequency wireless charging. Therefore, two ends of the low-frequency coils L1 are also equivalently short-circuited at the high operating frequency. In this way, resonance of the low-frequency coils L1 under high frequencies caused by a parasitic capacitor Cp is eliminated, and hence power transmission efficiency of the system is improved.

In some embodiments, referring to FIG. 6, a circuit structure of a charging module according to an embodiment of the present disclosure is illustrated. Based on the charging module as illustrated in FIG. 2, the low-frequency charging unit 120 further includes: an input clamp circuit 124, wherein one terminal of the input clamp circuit 124 is connected between the output terminal of the low-frequency compensation circuit 121 and the input terminal of the low-frequency rectifier circuit 122, and the other terminal of the input clamp circuit 124 is connected to ground.

The input clamp circuit 124 includes: a first resistor R1, wherein one terminal of the first resistor R1 is connected to the first output terminal of the low-frequency compensation circuit 121 and the first input terminal of the low-frequency rectifier circuit 122; a seventh transistor Q7, wherein a drain of the seventh transistor Q7 is connected to the other terminal of the first resistor R1, and a source of the seventh transistor Q7 is connected to ground; a second resistor R2, wherein one terminal of the second resistor R2 is connected between the second output terminal of the low-frequency compensation circuit 121 and the second input terminal of the low-frequency rectifier circuit 122; and an eighth transistor Q8, wherein a drain of the eighth transistor Q8 is connected to the other terminal of the second resistor R2, and a source of the eighth transistor Q8 is connected to the source of the seventh transistor Q7 and connected to ground.

The control terminal of the controller 140 is connected to gates of the seventh transistor Q7 and the eighth transistor Q8, and the controller 140 is configured to control, in response to detecting that the high-frequency charging unit 130 supplies power to the battery BAT, the seventh transistor Q7 and the eighth transistor Q8 to be turned on, such that the low-frequency coils L1 are short-circuited at the high operating frequency.

According to the embodiments of the present disclosure, the seventh transistor Q7 and the eighth transistor Q8 are controlled to be turned on, and since impedances of the first resistor R1 and the second resistor R2 are much less than an impedance of the parasitic capacitor Cp under high frequencies, two ends of the low-frequency coils L1 are also equivalently short-circuited at the high operating frequency. In this way, resonance of the low-frequency coils L1 under high frequencies caused by the parasitic capacitor Cp is eliminated, and hence power transmission efficiency of the system is improved.

Fourth Embodiment

This embodiment of the present disclosure provides a charging module. Referring to FIG. 2, a schematic structural block diagram of a charging module 100 according to an embodiment of the present disclosure is illustrated. The charging module 100 is applicable to a receiver of a dual-mode wireless charging system. The charging module 100 includes: a DC/DC converter circuit 110, a low-frequency charging unit 120, a high-frequency charging unit 130, and a controller 140.

An output terminal of the DC/DC converter circuit 120 is configured to supply power to a battery BAT.

The low-frequency charging unit 120 includes: low-frequency coils L1; a low-frequency compensation circuit 121, wherein an input terminal of the low-frequency compensation circuit 121 is connected to the low-frequency coils L1; and a low-frequency rectifier circuit 122, wherein an input terminal of the low-frequency rectifier circuit 122 is connected to an output terminal of the low-frequency compensation circuit 121, and an output terminal of the low-frequency rectifier circuit 122 is connected to an input terminal of the DC/DC converter circuit 110.

The high-frequency charging unit 130 includes: high-frequency coils L2; a high-frequency tuning circuit 131, wherein an input terminal of the high-frequency tuning circuit 131 is connected to the high-frequency coils L2; and a high-frequency rectifier circuit 132, wherein an input terminal of the high-frequency rectifier circuit 132 is connected to an output terminal of the high-frequency tuning circuit 131, and an output terminal of the high-frequency rectifier circuit 132 is connected to an input terminal of the DC/DC converter circuit 110.

The controller 140 is configured to control, in response to detecting that the high-frequency charging unit 130 supplies power to the battery BAT, the low-frequency charging unit 120 to be turned off, such that the low-frequency coils L1 are open-circuited at a high operating frequency.

In some embodiments, referring to FIG. 7, a circuit structure of the charging module 100 according to an embodiment of the present disclosure is illustrated. Based on the charging module as illustrated in FIG. 2, the low-frequency charging unit 120 further includes: a coil switch S1, wherein the coil switch S1 is connected to a midpoint of wires of the low-frequency coils L1, the control terminal of the controller 140 is connected to the coil switch S1, and the controller 140 is configured to control, in response to detecting that the high-frequency charging unit 130 supplies power to the battery BAT, the coil switch S1 to be turned off, such that the low-frequency coils L1 are open-circuited.

Figure 8:
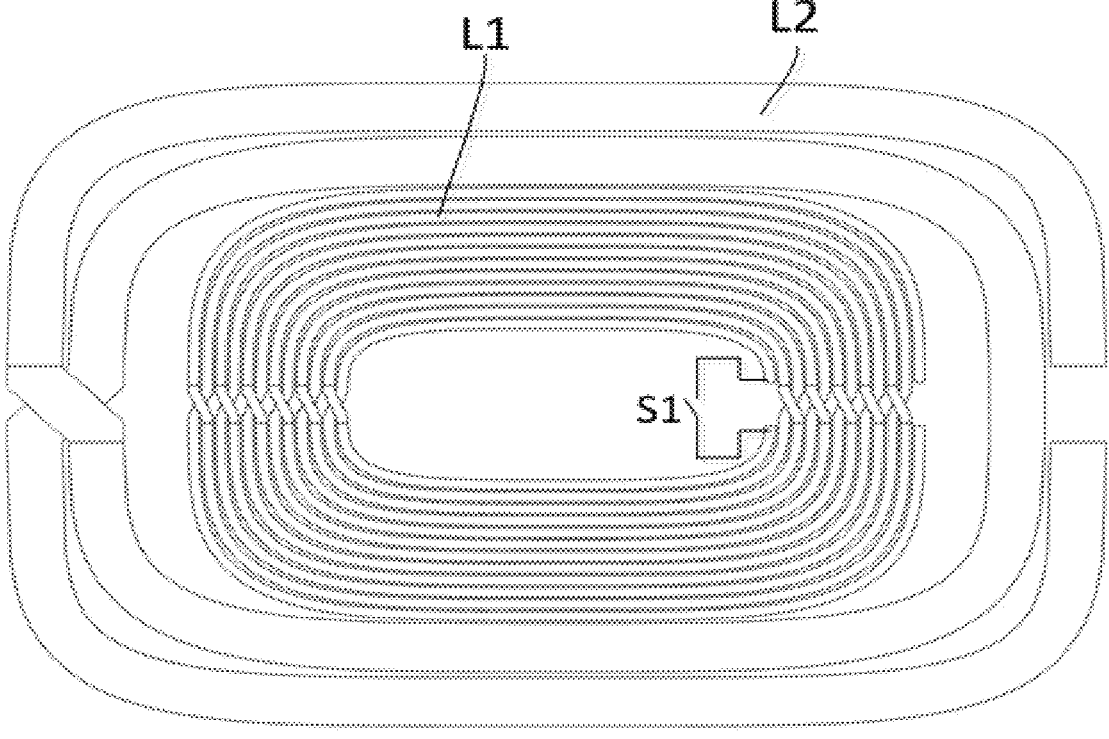
FIG. 8 is a schematic structural view of low-frequency coils and high-frequency coils in a coil plane according to an embodiment of the present disclosure.

Specifically, referring to FIG. 8, a structure of the low-frequency coils and the high-frequency coils in the coil plane according to an embodiment of the present disclosure is illustrated. As illustrated in FIG. 8, respective ports of the high-frequency coils L2 and the low-frequency coils L1 are arranged at right-side breaks of the coil structures, and the high-frequency coils L2 and the low-frequency coils L1 are connected to the charging module via their respective ports. The coil switch S1 is disposed at a central position of the wires of the low-frequency coils L1. That is, in the case that the low-frequency coils L1 are stretched to a straight wire, the central point of the low-frequency coils L1 is broken, and the two parts are connected via the coil switch S1. In the case that the coil switch S1 is turned on, the two parts are conducted. This configuration may reduce the total inductance of the low-frequency coils to the greatest maximum, such that the total inductance is approximately half of the total inductance before breaking of the coils. In addition, the switch disposed at the center of the coils may also reduce the parasitic capacitance to the greatest extent, such that the self-resonance frequency of the low-frequency coils L1 is significantly increased in the case that the coil switch S1 is turned off, such that power transmission efficiency of the system is improved.

Fifth Embodiment

Figure 9:
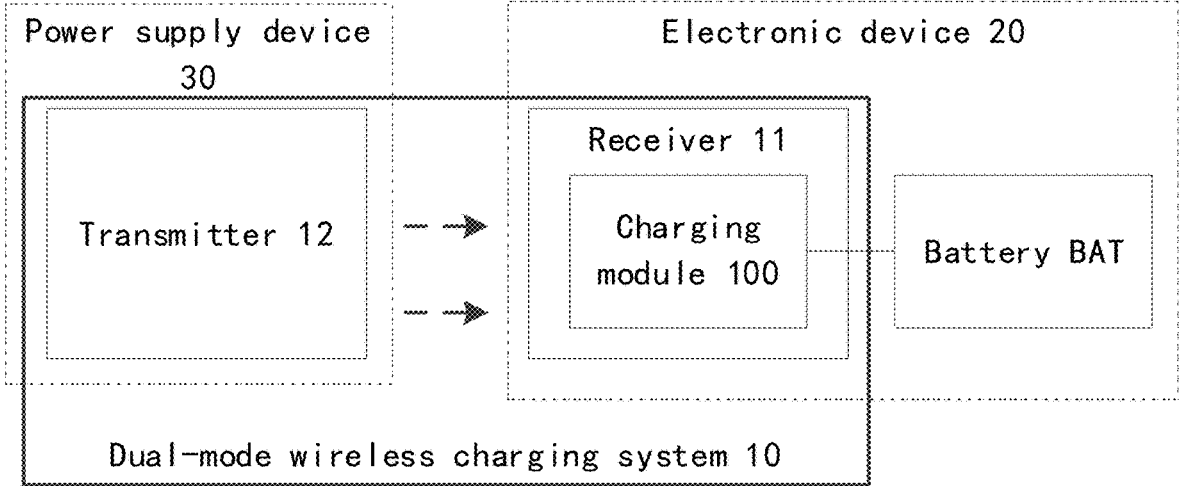
FIG. 9 is a schematic structural diagram of a dual-mode wireless charging system according to an embodiment of the present disclosure.

This embodiment of the present disclosure provides a dual-mode wireless charging system. Referring to FIG. 9, a structural block diagram of a dual-mode wireless charging system 10 according to an embodiment of the present disclosure is illustrated. The dual-mode wireless charging system 10 includes a receiver 11, including the charging module 100 according to any one of the first to fourth embodiments as described above, and disposed in an electronic device 20; wherein the electronic device 20 may be a mobile phone, a tablet computer, or the like mobile terminal, or any other portable electronic device, and the electronic device 20 is further provided with a battery configured to supply power to power consuming modules in the electronic device 20, a transmitter 12, configured to supply power to the receiver 11 in response to approaching a predetermined range of the receiver 11, and disposed in a power supply device 30.

The embodiments of the present disclosure provide a charging module. The charging module includes: a DC/DC converter circuit, a low-frequency wireless charging unit, a high-frequency wireless charging unit, and a controller. The low-frequency wireless charging unit includes low-frequency coils, a low-frequency compensation circuit, and a low-frequency rectifier circuit connected to the DC/DC converter circuit. The low-frequency coils, the low-frequency compensation circuit, and the low-frequency rectifier circuit are successively connected. The high-frequency wireless charging unit includes high-frequency coils, a high-frequency tuning circuit, and a high-frequency rectifier circuit connected to the DC/DC converter circuit. The high-frequency coils, the high-frequency tuning circuit, and the high-frequency rectifier circuit are successively connected. According to the present disclosure, the high-frequency coils are non-coaxial from the low-frequency coils and partially overlapped with the low-frequency coils, and/or the controller is configured to control, in response to detecting that the high-frequency wireless charging unit supplies power to the battery, the low-frequency wireless charging unit to be turned on or turned off, such that the low-frequency coils are short-circuited or open-circuited at a high operating frequency. In this way, the charging module according to the embodiments of the present disclosure, when applied to the dual-mode wireless charging system, is capable of eliminating self-resonance of the low-frequency coils under high frequencies, and hence improving power transmission efficiency of the system.

It should be noted that the above-described device embodiments are merely for illustration purpose only. The units which are described as separate components may be physically separated or may be not physically separated, and the components which are illustrated as units may be or may not be physical units, that is, the components may be located in the same position or may be distributed into a plurality of network units. Part or all of the modules may be selected according to the actual needs to achieve the objects of the technical solutions of the embodiments.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A charging module, applicable to a receiver of a dual-mode wireless charging system, the charging module comprising:

a DC/DC converter circuit, wherein an output terminal of the DC/DC converter circuit is configured to supply power to a battery;

a low-frequency charging unit, comprising:
  low-frequency coils;
  a load modulation circuit;
  a low-frequency compensation circuit, wherein an input terminal of the low-frequency compensation circuit is connected to the low-frequency coils; and
  a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit;

a high-frequency charging unit, comprising:
  high-frequency coils being non-coaxial with the low-frequency coils and partially overlapped with the low-frequency coils, wherein terminals of the low-frequency coils are separated from terminals of high-frequency coils, and wherein the load modulation circuit is isolated from the terminals of high-frequency coils;
  a high-frequency tuning circuit, wherein an input terminal of the high-frequency tuning circuit is connected to the high-frequency coils; and
  a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit; and a controller configured to control, in response to detecting that the high-frequency charging unit supplies power to the battery, a plurality of load modulation circuit switches of the load modulation circuit to be turned on, such that the low-frequency coils are short-circuited at a high operating frequency without introducing additional capacitance to input terminals of the high-frequency rectifier circuit.

2. The charging module according to claim 1, wherein:
the low-frequency coils and the high-frequency coils satisfy the following relationship in a coil plane:

$$R_1 < d < R_1 + r_2$$

$$R_2 < d < R_2 + r_1$$

wherein d represents a distance between a center of the low-frequency coils and a center of the high-frequency coils in the coil plane, $R_1$ represents an outer diameter of a contour of the high-frequency coils, $r_1$ represents an inner diameter of the contour of the high-frequency coils, $R_2$ represents an outer diameter of a contour of the low-frequency coils, and $r_2$ represents an inner diameter of the contour of the low-frequency coils.

3. The charging module according to claim 2, wherein:
the high-frequency coils comprise at least two turns of sub-coils, and wherein a resonance capacitor is connected in parallel to an innermost turn of the sub-coils of the high-frequency coils.

4. The charging module according to claim 1, wherein the low-frequency rectifier circuit comprises:
a first transistor, wherein a source of the first transistor is connected to a first output terminal of the low-frequency compensation circuit;
a second transistor, wherein a source of the second transistor is connected to a second output terminal of the low-frequency compensation circuit, and a drain of the second transistor is connected to a drain of the first transistor;

a third transistor, wherein a drain of the third transistor is connected to the source of the first transistor, and a source of the third transistor is connected to ground; and a fourth transistor, wherein a drain of the fourth transistor is connected to the source of the second transistor, and a source of the fourth transistor is connected to the source of the third transistor and connected to ground, and wherein:

a control terminal of the controller is connected to gates of the first transistor, the second transistor, the third transistor, and the fourth transistor, and the controller is configured to, in response to detecting that the high-frequency charging unit supplies power to the battery, control one of the first transistor and the third transistor to be turned on, and control one of the second transistor and the fourth transistor to be turned on, such that the low-frequency coils are short-circuited at the high operating frequency.

5. The charging module according to claim 1, wherein one terminal of the load modulation circuit is connected between the output terminal of the low-frequency compensation circuit and the input terminal of the low-frequency rectifier circuit, and the other terminal of the load modulation circuit is connected to ground, and wherein the load modulation circuit comprises:

a first capacitor, wherein one terminal of the first capacitor is connected between a first output terminal of the low-frequency compensation circuit and a first input terminal of the low-frequency rectifier circuit;

a fifth transistor, wherein a drain of the fifth transistor is connected to the other terminal of the first capacitor, and a source of the fifth transistor is connected to ground;

a second capacitor, wherein one terminal of the second capacitor is connected between a second output terminal of the low-frequency compensation circuit and a second input terminal of the low-frequency rectifier circuit; and a sixth transistor, wherein a drain of the sixth transistor is connected to the other terminal of the second capacitor, and a source of the sixth transistor is connected to the source of the fifth transistor and connected to ground, and wherein a control terminal of the controller is connected to gates of the fifth transistor and the sixth transistor, and the controller is configured to control, in response to detecting that the high-frequency charging unit supplies power to the battery, the fifth transistor and the sixth transistor to be turned on, such that the low-frequency coils are short-circuited at the high operating frequency.

6. The charging module according to claim 1, wherein the low-frequency charging unit further comprises:

an input clamp circuit, wherein one end of the input clamp circuit is connected between the output terminal of the low-frequency compensation circuit and the input terminal of the low-frequency rectifier circuit, and the other terminal of the input clamp circuit is connected to ground, and wherein the input clamp circuit comprises:

a first resistor, wherein one terminal of the first resistor is connected between a first output terminal of the low-frequency compensation circuit and a first input terminal of the low-frequency rectifier circuit;

a seventh transistor, wherein a drain of the seventh transistor is connected to the other terminal of the first resistor, and a source of the seventh transistor is connected to ground;

a second resistor, wherein one terminal of the second resistor is connected between a second output terminal of the low-frequency compensation circuit and a second input terminal of the low-frequency rectifier circuit; and an eighth transistor, wherein a drain of the eighth transistor is connected to the other terminal of the second resistor, and a source of the eighth transistor is connected to the source of the seventh transistor and connected to ground, and wherein:

a control terminal of the controller is connected to gates of the seventh transistor and the eighth transistor, and the controller is configured to control, in response to detecting that the high-frequency charging unit supplies power to the battery, the seventh transistor and the eighth transistor to be turned on, such that the low-frequency coils are short-circuited at the high operating frequency.

7. The charging module according to claim 1, wherein the low-frequency charging unit further comprises a coil switch, and wherein:

the coil switch is connected to a midpoint of wires of the low-frequency coils;

a control terminal of the controller is connected to the coil switch; and the controller is configured to control, in response to detecting that the high-frequency charging unit supplies power to the battery, the coil switch to be turned off, such that the low-frequency coils are open-circuited.

8. A charging module, applicable to a receiver of a dual-mode wireless charging system, the charging module comprising:

a DC/DC converter circuit, wherein an output terminal of the DC/DC converter circuit is configured to supply power to a battery;

a low-frequency charging unit, comprising:

low-frequency coils;

a load modulation circuit;

a low-frequency compensation circuit, wherein an input terminal of the low-frequency compensation circuit is connected to the low-frequency coils; and a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit;

a high-frequency charging unit, comprising:

high-frequency coils being non-coaxial with the low-frequency coils and partially overlapped with the low-frequency coils, and wherein the load modulation circuit is isolated from the high-frequency coils;

a high-frequency tuning circuit, wherein an input terminal of the high-frequency tuning circuit is connected to the high-frequency coils; and a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit; and a controller configured to control, in response to detecting that the high-frequency charging unit supplies power to the battery, a plurality of load modulation circuit switches of the load modulation circuit to be turned on, such that the low-frequency coils are short-circuited at a high operating frequency without introducing additional capacitance to input terminals of the high-frequency rectifier circuit.

9. The charging module according to claim 8, wherein:

the low-frequency coils and the high-frequency coils satisfy the following relationship in a coil plane:

$$R_1 < d < R_1 + r_2$$

$$R_2 < d < R_2 + r_1$$

wherein d represents a distance between a center of the low-frequency coils and a center of the high-frequency coils in the coil plane, $R_1$ represents an outer diameter of a contour of the high-frequency coils, $r_1$ represents an inner diameter of the contour of the high-frequency coils, $R_2$ represents an outer diameter of a contour of the low-frequency coils, and $r_2$ represents an inner diameter of the contour of the low-frequency coils.

10. The charging module according to claim 9, wherein:

the high-frequency coils comprise at least two turns of sub-coils, and a resonance capacitor is connected in parallel to an innermost turn of the sub-coils of the high-frequency coils.

11. A charging module, applicable to a receiver of a dual-mode wireless charging system, the charging module comprising:

a DC/DC converter circuit, wherein an output terminal of the DC/DC converter circuit is configured to supply power to a battery;

a low-frequency charging unit, comprising:

low-frequency coils;

a low-frequency compensation circuit, wherein an input terminal of the low-frequency compensation circuit is connected to the low-frequency coils; and a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit;

a high-frequency charging unit, comprising:

high-frequency coils;

a high-frequency tuning circuit, wherein an input terminal of the high-frequency tuning circuit is connected to the high-frequency coils; and a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit; and a controller, configured to control, in response to detecting that the high-frequency charging unit supplies power to the battery, the low-frequency rectifier circuit to be turned on, such that the low-frequency coils are short-circuited at a high operating frequency.

12. The charging module according to claim 11, wherein the low-frequency rectifier circuit comprises:

a first transistor, and wherein a source of the first transistor is connected to a first output terminal of the low-frequency compensation circuit;

a second transistor, and wherein a source of the second transistor is connected to a second output terminal of the low-frequency compensation circuit, and a drain of the second transistor is connected to a drain of the first transistor;

a third transistor, and wherein a drain of the third transistor is connected to the source of the first transistor, and a source of the third transistor is connected to ground; and a fourth transistor, and wherein a drain of the fourth transistor is connected to the source of the second transistor, and a source of the fourth transistor is connected to the source of the third transistor and connected to ground, and wherein:

a control terminal of the controller is connected to gates of the first transistor, the second transistor, the third transistor, and the fourth transistor, and the controller is configured to, in response to detecting that the high-frequency charging unit supplies power to the battery, control one of the first transistor and the third transistor to be turned on, and control one of the second transistor and the fourth transistor to be turned on, such that the low-frequency coils are short-circuited at the high operating frequency.

13. The charging module according to claim 11, wherein the low-frequency charging unit further comprises:

a load modulation circuit, and wherein one terminal of the load modulation circuit is connected between the output terminal of the low-frequency compensation circuit and the input terminal of the low-frequency rectifier circuit, and the other terminal of the load modulation circuit is connected to ground, and wherein the load modulation circuit comprises:

a first capacitor, and wherein one terminal of the first capacitor is connected between a first output terminal of the low-frequency compensation circuit and a first input terminal of the low-frequency rectifier circuit;

a fifth transistor, and wherein a drain of the fifth transistor is connected to the other terminal of the first capacitor, and a source of the fifth transistor is connected to ground;

a second capacitor, and wherein one terminal of the second capacitor is connected between a second output terminal of the low-frequency compensation circuit and a second input terminal of the low-frequency rectifier circuit; and a sixth transistor, and wherein a drain of the sixth transistor is connected to the other terminal of the second capacitor, and a source of the sixth transistor is connected to the source of the fifth transistor and connected to ground, and wherein:

a control terminal of the controller is connected to gates of the fifth transistor and the sixth transistor, and the controller is configured to control, in response to detecting that the high-frequency charging unit supplies power to the battery, the fifth transistor and the sixth transistor to be turned on, such that the low-frequency coils are short-circuited at the high operating frequency.

14. The charging module according to claim 11, wherein the low-frequency charging unit further comprises:

an input clamp circuit, and wherein one end of the input clamp circuit is connected between the output terminal of the low-frequency compensation circuit and the input terminal of the low-frequency rectifier circuit, and the other terminal of the input clamp circuit is connected to ground, and wherein the input clamp circuit comprises:

a first resistor, and wherein one terminal of the first resistor is connected between a first output terminal of the low-frequency compensation circuit and a first input terminal of the low-frequency rectifier circuit;

a seventh transistor, and wherein a drain of the seventh transistor is connected to the other terminal of the first resistor, and a source of the seventh transistor is connected to ground;

a second resistor, and wherein one terminal of the second resistor is connected between a second output terminal of the low-frequency compensation circuit and a second input terminal of the low-frequency rectifier circuit; and an eighth transistor, and wherein a drain of the eighth transistor is connected to the other terminal of the second resistor, and a source of the eighth transistor is connected to the source of the seventh transistor and connected to ground, and wherein:

a control terminal of the controller is connected to gates of the seventh transistor and the eighth transistor, and the controller is configured to control, in response to detecting that the high-frequency charging unit supplies power to the battery, the seventh transistor and the eighth transistor to be turned on, such that the low-frequency coils are short-circuited at the high operating frequency.

15. A dual-mode wireless charging system, comprising:

a receiver comprising a charging module disposed in an electronic device; and a transmitter configured to supply power to the receiver in response to approaching a predetermined range of the receiver, and disposed in a power supply device, wherein the charging module comprises:

a DC/DC converter circuit, wherein an output terminal of the DC/DC converter circuit is configured to supply power to a battery;

a low-frequency charging unit comprising:
  low-frequency coils;
  a load modulation circuit;
  a low-frequency compensation circuit, wherein an input terminal of the low-frequency compensation circuit is connected to the low-frequency coils; and
  a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit;

a high-frequency charging unit comprising:
  high-frequency coils being non-coaxial with the low-frequency coils and partially overlapped with the low-frequency coils, and wherein the load modulation circuit is isolated from the high-frequency coils;
  a high-frequency tuning circuit, wherein an input terminal of the high-frequency tuning circuit is connected to the high-frequency coils; and a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit; and a controller configured to control, in response to detecting that the high-frequency charging unit supplies power to the battery, a plurality of load modulation circuit switches of the load modulation circuit to be turned on, such that the low-frequency coils are short-circuited at a high operating frequency without introducing additional capacitance to input terminals of the high-frequency rectifier circuit.

16. A dual-mode wireless charging system, comprising:

a receiver, comprising a charging module disposed in an electronic device;

a transmitter, configured to supply power to the receiver in response to approaching a predetermined range of the receiver, and disposed in a power supply device;

a DC/DC converter circuit, wherein an output terminal of the DC/DC converter circuit is configured to supply power to a battery;

a low-frequency charging unit, comprising:
  low-frequency coils;
  a low-frequency compensation circuit, wherein an input terminal of the low-frequency compensation circuit is connected to the low-frequency coils; and
  a low-frequency rectifier circuit, wherein an input terminal of the low-frequency rectifier circuit is connected to an output terminal of the low-frequency compensation circuit, and an output terminal of the low-frequency rectifier circuit is connected to an input terminal of the DC/DC converter circuit;

a high-frequency charging unit, comprising:
  high-frequency coils;
  a high-frequency tuning circuit, wherein an input terminal of the high-frequency tuning circuit is connected to the high-frequency coils; and
  a high-frequency rectifier circuit, wherein an input terminal of the high-frequency rectifier circuit is connected to an output terminal of the high-frequency tuning circuit, and an output terminal of the high-frequency rectifier circuit is connected to the input terminal of the DC/DC converter circuit; and a controller configured to control, in response to detecting that the high-frequency charging unit supplies power to the battery, the low-frequency rectifier circuit to be turned on, such that the low-frequency coils are short-circuited at a high operating frequency.

17. The dual-mode wireless charging system according to claim 16, wherein:

the controller is configured to control, in response to detecting that the high-frequency charging unit supplies power to the battery, the low-frequency compensation circuit to be turned off, such that the low-frequency coils are open-circuited.

* * * * *